United States Patent
Yang et al.

(10) Patent No.: US 11,427,171 B2
(45) Date of Patent: Aug. 30, 2022

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Junho Yang, Seongnam-si (KR); Donghee Kang, Seongnam-si (KR); Kyujin Park, Namyangju-si (KR); Changhwan Song, Daejeon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/103,547

(22) Filed: Nov. 24, 2020

(65) Prior Publication Data

US 2022/0024428 A1 Jan. 27, 2022

(30) Foreign Application Priority Data

Jul. 21, 2020 (KR) .................. 10-2020-0090087

(51) Int. Cl.
*B60T 8/174* (2006.01)
*G01C 21/00* (2006.01)
(Continued)

(52) U.S. Cl.
CPC .............. *B60T 8/174* (2013.01); *B60T 8/171* (2013.01); *G01C 21/3815* (2020.08);
(Continued)

(58) Field of Classification Search
CPC .... B60T 8/174; B60T 8/171; B60T 2201/022; B60T 2210/32; G01C 21/3815;
(Continued)

(56) References Cited

U.S. PATENT DOCUMENTS 9,098,754 B1 * 8/2015 Stout .................. G06K 9/00805
2010/0156672 A1 * 6/2010 Yoo ..................... B62D 15/0285
340/932.2
(Continued)

FOREIGN PATENT DOCUMENTS

CN 110481556 A 11/2019
CN 110641366 A 1/2020
(Continued)

OTHER PUBLICATIONS

Extended European Search Report regarding EP20210007.9 dated Apr. 23, 2021, 11 pages.

*Primary Examiner* — Babar Sarwar
(74) *Attorney, Agent, or Firm* — Lempia Summerfield Katz LLC

(57) ABSTRACT

The vehicle includes: a sensor part configured to acquire occupancy information of an surrounding area of the vehicle and a speed of the vehicle; a camera configured to acquire a surrounding image of the vehicle; and a controller configured to form map information based on the occupancy information according to movement of the vehicle, determine presence or absence of an obstacle around the vehicle based on the map information and the surrounding image, and control, in response to presence of the obstacle, the vehicle based on the presence of the obstacle and a possibility of collision of the vehicle derived from the speed of the vehicle and the map information.

16 Claims, 11 Drawing Sheets

(51) Int. Cl.
  *G06V 20/58* (2022.01)
  *B60T 8/171* (2006.01)
  *G08G 1/16* (2006.01)

(52) U.S. Cl.
  CPC ............ *G06V 20/58* (2022.01); *G06V 20/586* (2022.01); *G08G 1/168* (2013.01); *B60T 2201/022* (2013.01); *B60T 2210/32* (2013.01)

(58) Field of Classification Search
  CPC ...... G06V 20/58; G06V 20/586; G08G 1/168; B60W 10/184; B60W 2050/0025; B60W 2050/0026; B60W 2420/403; B60W 2420/54; B60W 2554/4049; B60W 2554/801; B60W 2554/802; B60W 2710/182; B60W 60/0011; B60W 60/0016
  See application file for complete search history.

(56) References Cited

U.S. PATENT DOCUMENTS

| | | | |
|---|---|---|---|
| 2016/0016560 A1* | 1/2016 | Parker | B60W 30/09 701/70 |
| 2017/0274876 A1* | 9/2017 | Kim | B60W 30/0953 |
| 2017/0351267 A1* | 12/2017 | Mielenz | G05D 1/0289 |
| 2019/0310654 A1* | 10/2019 | Halder | G05D 1/0274 |
| 2020/0073399 A1* | 3/2020 | Tateno | G05D 1/0274 |
| 2020/0207338 A1* | 7/2020 | Cho | G08G 1/164 |
| 2021/0122364 A1* | 4/2021 | Lee | G06K 9/6256 |

FOREIGN PATENT DOCUMENTS

| | | |
|---|---|---|
| EP | 3674179 A1 | 7/2020 |
| KR | 10-2019-0062876 A | 6/2019 |

* cited by examiner

FIG.4D

VEHICLE AND METHOD OF CONTROLLING THE SAME

CROSS-REFERENCE TO RELATED APPLICATION

The present application claims priority to and the benefit of Korean Patent Application No. 10-2020-0090087, filed on Jul. 21, 2020, the entire contents of which are incorporated herein by reference.

FIELD

The present disclosure relates to a vehicle for performing parking collision-avoidance control during parking and a method of controlling the same.

BACKGROUND

The statements in this section merely provide background information related to the present disclosure and may not constitute prior art.

Autonomous driving technologies for vehicle are designed to automatically drive a vehicle by identifying the condition of a road, without a driver needing to control a brake, a steering wheel, an accelerator pedal, and the like.

The autonomous driving technology is a key technology for realizing smart cars. As for autonomous vehicles, the technologies include a highway driving assist (HAD) for automatically maintaining the distance between vehicles, a blind spot detection (BSD) for sounding alarm by detecting surrounding vehicles while reversing, an autonomous emergency braking (AEB) for activating a braking system upon failure to recognize a preceding vehicle, a lane departure warning system (LDWS), a lane keeping assistance system (LKAS) for inhibiting a vehicle from departing a lane without lighting a turn signal, a lane maintenance assistance system (LKAS) for avoiding leaving the lane without a turn signal, an advanced smart cruise control (ASCC) for performing travel at a designated speed while maintaining a distance between vehicles, a traffic jam assistant (TJA) system, a parking collision-avoidance assist (PCA), and the like.

In particular, with regard to the PCA, studies on sensors used for side collision avoidance assistance and control logic therefor have been actively conducted.

SUMMARY

The present disclosure provides a vehicle capable of inhibiting erroneous braking in a parking collision-avoidance assist (PCA) system by estimating the position of an obstacle using an ultrasonic sensor and a camera provided in the vehicle, and a method of controlling the same.

Additional aspects of the disclosure will be set forth in part in the description which follows and, in part, will be obvious from the description, or may be learned by practice of the disclosure.

It is an aspect of the disclosure to provide a vehicle including: a sensor part configured to acquire occupancy information of a surrounding area of the vehicle and a speed of the vehicle; a camera configured to acquire a surrounding image of the vehicle; and a controller configured to: form map information based on the occupancy information according to movement of the vehicle; determine presence or absence of an obstacle around the vehicle based on the map information and the surrounding image; and control, in response to the presence of the obstacle, the vehicle based on the presence of the obstacle and a possibility of collision of the vehicle derived from the speed of the vehicle and the map information.

The controller may form the map information by assigning a first weight to occupancy information of a first area that is measured in real time, and assigning a second weight greater than the first weight to occupancy information of a second area that is previously measured.

The controller may form the map information by assigning a third weight to the occupancy information corresponding to a third area having no obstacle.

The controller may classify each pixel included in an image based on the surrounding image into one of a space, a low obstacle, and a normal obstacle.

The controller may be configured to determine a time to collision between the vehicle and the obstacle, and when the possibility of collision of the vehicle exceeds a predetermined reference value, and the obstacle corresponds to the normal obstacle, stop the vehicle.

The controller may be configured to, when the possibility of collision of the vehicle exceeds a predetermined reference value, and the obstacle corresponds to the low obstacle, stop the vehicle after a predetermined time since the obstacle is detected.

The controller may be configured to determine a time to collision between the vehicle and the obstacle, and compare the time to collision with a reference braking time corresponding to the speed of the vehicle to determine a braking timing of the vehicle.

The controller may determine the occupancy information corresponding to the obstacle and pixels included in the surrounding image, and form the map information based on a covariance of the occupancy information and a covariance of the pixels.

The vehicle may further include an outputter, wherein the controller may output a warning signal to the outputter based on the possibility of collision of the vehicle.

The controller may determine the possibility of collision of the vehicle by comparing a reference time corresponding to the speed of the vehicle with a time to collision of the vehicle with the obstacle.

The vehicle may further include a braking part, wherein the controller may control the braking part based on the possibility of collision of the vehicle.

It is another aspect of the disclosure to provide a method of controlling a vehicle, the method including: acquiring occupancy information of a surrounding area of the vehicle and a speed of the vehicle; acquiring a surrounding image of the vehicle; forming map information based on the occupancy information according to movement of the vehicle; determining a presence or absence of an obstacle around the vehicle based on the map information and the surrounding image; and controlling, in response to the presence of the obstacle, the vehicle based on the presence of the obstacle and a possibility of collision of the vehicle derived from the speed of the vehicle and the map information.

The forming of the map information may include: forming the map information by assigning a first weight to occupancy information of a first area that is measured in real time; and assigning a second weight greater than the first weight to occupancy information of a second area that is previously measured.

The forming of the map information may include forming the map information by assigning a third weight to the occupancy information corresponding to a third area having no obstacle.

The forming of the map information may include classifying each pixel included in an image based on the surrounding image into one of a space, a low obstacle, and a normal obstacle.

The controlling of the vehicle may include: determining a time to collision between the vehicle and the obstacle; and when the possibility of collision of the vehicle exceeds a predetermined reference value, and the obstacle corresponds to the normal obstacle, stopping the vehicle.

The controlling of the vehicle may include: when the possibility of collision of the vehicle exceeds a predetermined reference value, and the obstacle corresponds to the low obstacle, stopping the vehicle after a predetermined time since the obstacle is detected.

The controlling of the vehicle may include determining a time to collision between the vehicle and the obstacle, and comparing the time to collision with a reference braking time corresponding to the speed of the vehicle to determine a braking timing of the vehicle.

The forming of the map information may include determining the occupancy information corresponding to the obstacle and pixels included in the surrounding image, and forming the map information based on a covariance of the occupancy information and a covariance of the pixels.

It is another aspect of the disclosure to provide a vehicle including: an ultrasonic sensor configured to acquire occupancy information of a surrounding area of the vehicle based on an ultrasonic signal; a wheel speed sensor configured to acquire a speed of the vehicle; a camera configured to acquire a surrounding image of the vehicle; and at least one processor configured to: assign an occupation probability corresponding to the occupancy information; by using a time-slice measurement model determined based on the speed of the vehicle, assign a first weight to occupancy information of a first area that is measured in real time, and assign a second weight greater than the first weight to occupancy information of a second area that is previously measured to determine an occupancy probability of the previously measured area, assign a third weight to occupancy information corresponding to a third area to reduce an occupancy probability corresponding to the third area; determine coordinate information corresponding to the surrounding image and the vehicle; determine an obstacle map by classifying each pixel corresponding to the occupancy information into at least one of a space, a low obstacle, and a normal obstacle on the basis of a covariance corresponding to map information based on the occupancy information and a covariance of coordinate information based on the surrounding image; and control the vehicle based on the obstacle map.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

These and/or other aspects of the disclosure will become apparent and more readily appreciated from the following description of the embodiments, taken in conjunction with the accompanying drawings of which:

FIGS. 4A to 4D are diagrams for describing a process of forming map information according to one form of the present disclosure;

Figure 1:
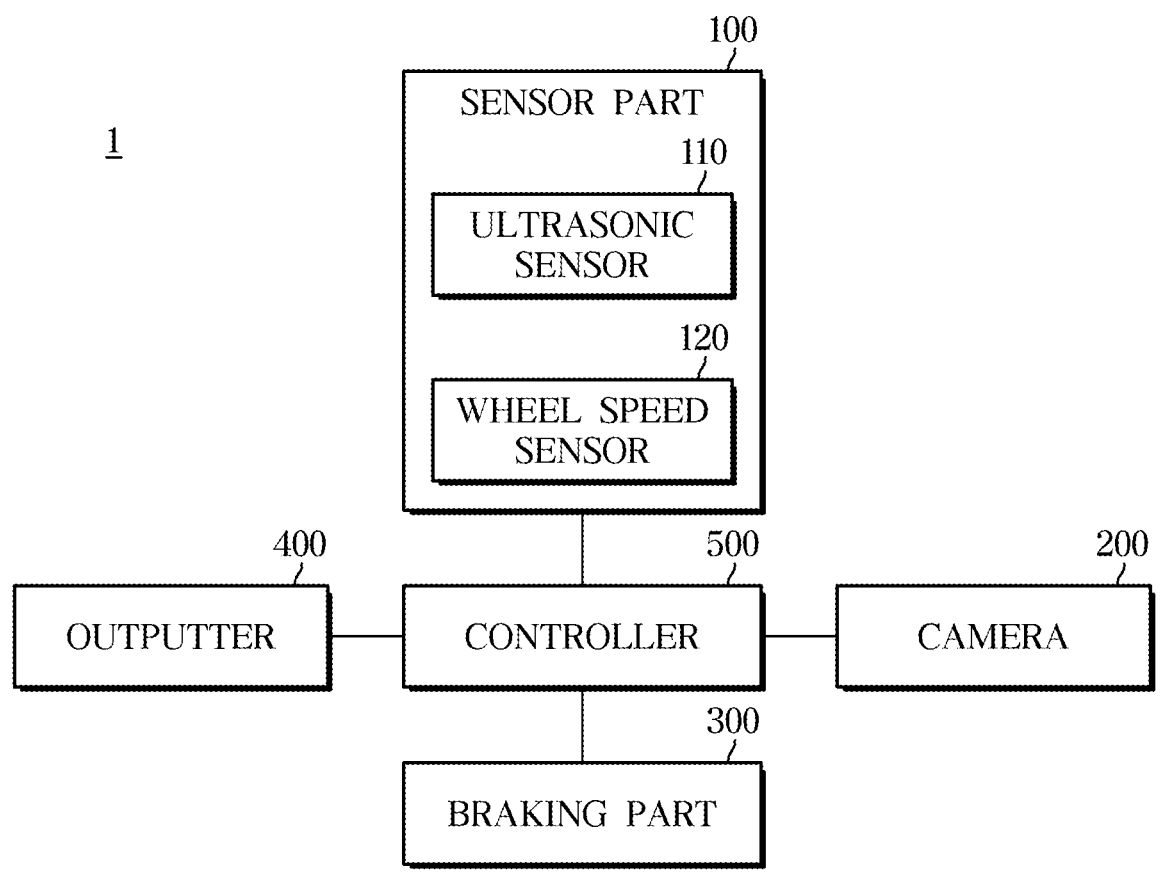
FIG. 1 is a control block diagram illustrating a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like numerals refer to like elements throughout the specification. Not all elements of forms of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 is a control block diagram illustrating a vehicle 1 according to one form of the present disclosure.

Referring to FIG. 1, the vehicle 1 according to one form may include a sensor part 100, a camera 200, an outputter 400, a braking part 300, and a controller 500.

The sensor part 100 may include an ultrasonic sensor 110 and a wheel speed sensor 120.

The ultrasonic sensor 110 may employ a method of transmitting ultrasonic waves and detecting a distance to an obstacle using ultrasonic waves reflected from the obstacle.

The sensor part 100 may acquire occupancy information of a surrounding area of the vehicle.

The occupancy information may refer to information obtained by determining whether a space around the vehicle is occupied by a specific object, such as an obstacle.

The wheel speed sensor 120 is installed at each of four wheels including front and rear wheels to detect the rotational speed of the wheel by a change in magnetic field lines of a tone wheel and a sensor.

The camera 200 may acquire a surrounding image of the vehicle.

According to one form of the present disclosure, the camera 200 may be provided at the front, rear, and sides of the vehicle to acquire an image.

The camera 200 installed on the vehicle may include a charge-coupled device (CCD) camera or a complementary metal-oxide semiconductor (CMOS) color image sensor. Here, the CCD and the CMOS may refer to a sensor that converts light received through a lens of the camera into an electric signal. In detail, the CCD camera refers to an apparatus that converts an image into an electric signal using a charge-coupled device. In addition, a CMOS image sensor (CIS) refers to a low-consumption and low-power type image pickup device having a CMOS structure, and serves as an electronic film of a digital device. In general, the CCD has a sensitivity superior than that of the CIS and thus is widely used in the vehicle, but the present disclosure is not limited thereto.

The braking part 300 may control the speed of the vehicle based on a signal from the controller.

The braking part 300 according to one form may include a hydraulic control unit (HCU) that is a hydraulic control device, a sensor that detects the speed of a wheel, a pedal travel switch (PTS) that detects a state of stepping on a brake, a disc brake, and a caliper, but the present disclosure is not limited thereto.

The outputter 400 may be configured to output a warning signal based on a possibility of collision.

According to the one form of the present disclosure, the outputter 400 may be configured to include a display or speaker provided in a cluster or center fascia of a vehicle.

The controller 500 may form map information based on occupancy information according to movement of the vehicle.

That is, the controller 500 may acquire occupancy information using a time slice measurement model according to movement of the vehicle, and form map information based on the occupancy information. Details thereof will be described below.

The map information may refer to information formed based on the occupancy information and indicating whether an obstacle exists around the vehicle.

The controller 500 may determine whether an obstacle exists around the vehicle based on the map information and the surrounding image.

That is, the controller 500 may determine presence or absence of an obstacle around the vehicle using the occupancy information acquired by the ultrasonic sensor together with the surrounding image acquired by the camera.

The controller 500 may, in response to the presence of the obstacle, control the braking part 300 based on the presence of the obstacle and the possibility of collision of the vehicle derived based on the speed of the vehicle and the map information.

That is, the controller 500 may immediately stop the vehicle by operating the braking part when a collision is expected to occur between the vehicle and the obstacle based on the above-described operation.

The controller may form the map information by assigning a first weight to occupancy information of an area measured in real time, and assigning a second weight greater than the first weight to occupancy information of an area previously measured.

Specifically, with regard to occupancy information acquired by the ultrasonic sensor, a previously measured area is determined to have occupancy information with a higher reliability. Accordingly, the occupancy information of the previously measured area is assigned a weight higher than that of the occupancy information acquired in real time or acquired at a later time, when forming the map information.

The controller 500 may form the map information by assigning a third weight to occupancy information corresponding to a space. That is, as for each obstacle, an obstacle previously measured and an obstacle to be measured in real time may be assigned respective weights, and a space having no obstacle may be assigned a unique weight in forming the map information. Details thereof will be descried below.

The controller 500 may classify each pixel included in an image based on the surrounding image into at least one of a space, a low obstacle, and a normal obstacle.

Image information acquired by the camera 200 may include a set of a plurality of pixels, and in response to determining that the presence of an obstacle, the controller may determine the type of each obstacle as a low obstacle, such as a stopper, and a high obstacle, such as a vehicle.

In addition, when an obstacle does not exist, the corresponding area may be determined as a space.

The controller may determine a time to collision between the vehicle and the obstacle. Meanwhile, the controller may determine the possibility of collision based on the time to collision.

The controller 500, when the possibility of collision exceeds a predetermined reference value, and the obstacle corresponds to the normal obstacle, may control the braking part to stop the vehicle to inhibit a collision.

On the other hand, the controller 500, when the possibility of collision exceeds the predetermined reference value, and the obstacle corresponds to the low obstacle, may control the braking part to stop the vehicle after a predetermined time since the obstacle is detected.

The controller may set a longer braking time for a low obstacle than a normal obstacle.

The controller 500 may determine the time to collision between the vehicle and the obstacle, and determine a braking timing of the vehicle by comparing the time to collision with a reference braking time corresponding to the speed of the vehicle.

The controller 500 may determine occupancy information corresponding to an obstacle and pixels included in the surrounding image, and form the map information based on a covariance of the occupancy information and a covariance of the pixels.

The controller 500 may output a warning signal to the outputter based on the possibility of collision. The warning signal may be provided as a visual signal or an audible signal, such as sound. The form or type of the warning signal is not limited.

The controller 500 may determine the possibility of collision by comparing a reference time corresponding to the speed of the vehicle and a time to collision between the vehicle and the obstacle.

The controller 500 may include a memory (not shown) for storing data regarding an algorithm for controlling the operations of the components of the vehicle or a program that represents the algorithm, and a processor (not shown) that performs the above described operations using the data stored in the memory. In this case, the memory and the processor may be implemented as separate chips. Alternatively, the memory and the processor may be implemented as a single chip.

At least one component may be added or omitted to correspond to the performances of the components of the vehicle shown in FIG. 1. In addition, the mutual positions of the components may be changed to correspond to the performance or structure of the system.

Some of the components shown in FIG. 1 may refer to a software component and/or a hardware component, such as a Field Programmable Gate Array (FPGA) and an Application Specific Integrated Circuit (ASIC).

Figure 2:
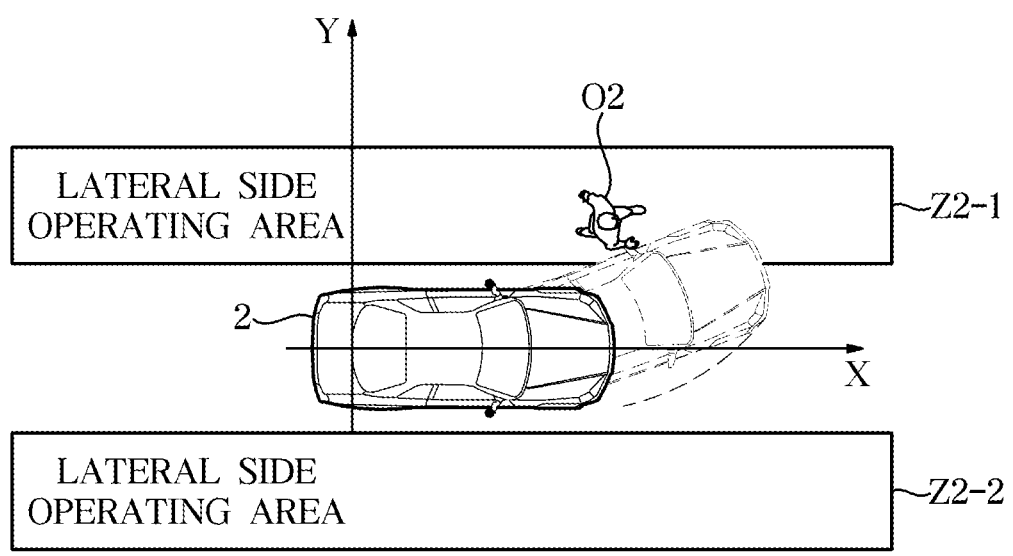
FIG. 2 is a diagram for describing a side obstacle detection area according to one form of the present disclosure.

FIG. 2 is a diagram for describing a side obstacle detection area according to one form of the present disclosure.

Referring to FIG. 2, the vehicle may acquire occupancy information of a surrounding area of the vehicle using an ultrasonic sensor provided in the vehicle and estimate the position of an obstacle based on the occupancy information.

In FIG. 2, occupancy information of regions Z2-1 and Z2-2 may be acquired.

In the case of FIG. 2, the occupancy information of region Z2-1 may be acquired while the vehicle is travelling.

In this case, based on the presence of an obstacle O2, it may be determined that the corresponding region is occupied.

In addition, the controller may determine the position of the corresponding obstacle O2.

That is, the ultrasonic sensor provided in the vehicle may acquire the occupancy information of the corresponding regions Z2-1 and Z2-2.

Figure 3:
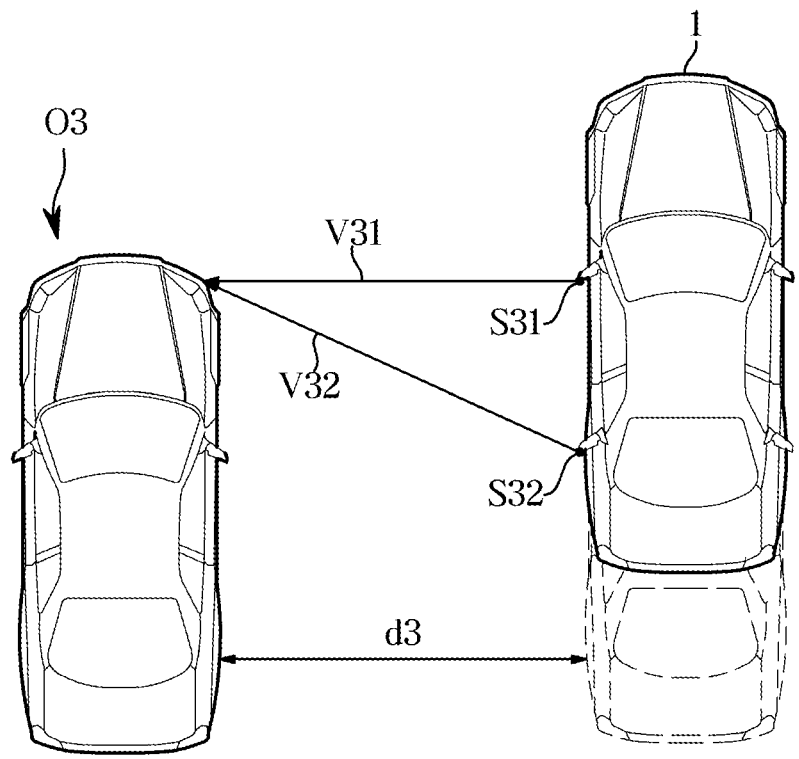
FIG. 3 is a diagram for describing a time slice measurement model according to one form of the present disclosure.

FIG. 3 is a diagram for describing a time slice measurement model according to one form of the present disclosure.

Referring to FIG. 3, an operation of estimating the shape and position of an obstacle based on a time slice measurement model is shown.

Specifically, the vehicle may determine the shape and position of the obstacle while moving.

That is, the vehicle may employ a time slice measurement model to estimate the position $X_3$ of the obstacle based on the ultrasonic sensor.

The controller may predict the speed of the vehicle based on the speed of the vehicle acquired through the wheel speed sensor, and calculate the positions S31 and S32 of the ultrasonic sensors of the map information at each time.

In addition, when an obstacle is detected while the vehicle is in progress, the controller may accumulate and store distance measurement values to construct measurement vectors V31 and V32.

In addition, the controller may predict the distance D3 to the obstacle from the ultrasonic sensor based on the measurement vector of the vehicle.

Specifically, the distance between the vehicle and the obstacle may be determined based on the following matrix.

$$h(X_k) = d_k = \begin{pmatrix} |X_2 - X_1| \\ \ldots \\ |X_k - X_{k-1}| \end{pmatrix} \quad \text{[Equation 1]}$$

Referring to Equation 1, h refers to an operation for determining the distance between the vehicle and the obstacle based on the vector, d refers to the distance between the vehicle and the obstacle, and X refers to the position value of the obstacle over time.

In addition, the controller may correct the position of the obstacle using Equation 2.

$$X_k = X_{k-1} + K_k(X_k - h(X_{k-1})) \quad \text{[Equation 2]}$$

Referring to Equation 2, the controller may estimate the position of the obstacle in real time based on Equation 2 by obtaining a nonlinear filter gain $K_k$ for each measurement period of the ultrasonic sensor and correcting the position of the obstacle estimated in a previous time step k-1.

Further, the controller may generate the map information by storing each estimated position of the obstacle.

Meanwhile, the operation of determining the position of the obstacle described in FIG. 3 is only one form of the present disclosure, and there is no limitation on the operation as long as it can improve the measurement accuracy of the position of the obstacle.

FIGS. 4A to 4D are diagrams for describing a process of forming map information according to one form of the present disclosure.

The controller may form an occupancy grid map when forming the map information. Specifically, the controller divides a surrounding area of the vehicle into cells having a certain interval, and may represent whether an obstacle exists in each cell as an occupancy probability between 0 and 1.

When ultrasonic sensor-distance measurement values are obtained, the controller may determine an area occupied by the distance measurement value within a beam angle as an obstacle detected area, and determine an area from the sensor position to the position corresponding to the distance measurement value within the beam angle as an obstacle undetected area.

In addition, when sound wave sensor-distance measurement values are not obtained, the controller may determine all areas indicated by a beam angle as obstacle undetected areas.

The controller may update the occupancy probability of each cell by adding a first weight or second weight to the obstacle detected area and adding a third weight to the obstacle undetected area, that is, a space area.

Meanwhile, the third weight may be determined as a negative weight.

All cells outside a detection range of the ultrasonic sensor of the vehicle may maintain the previous occupancy probability.

Figure 4A:
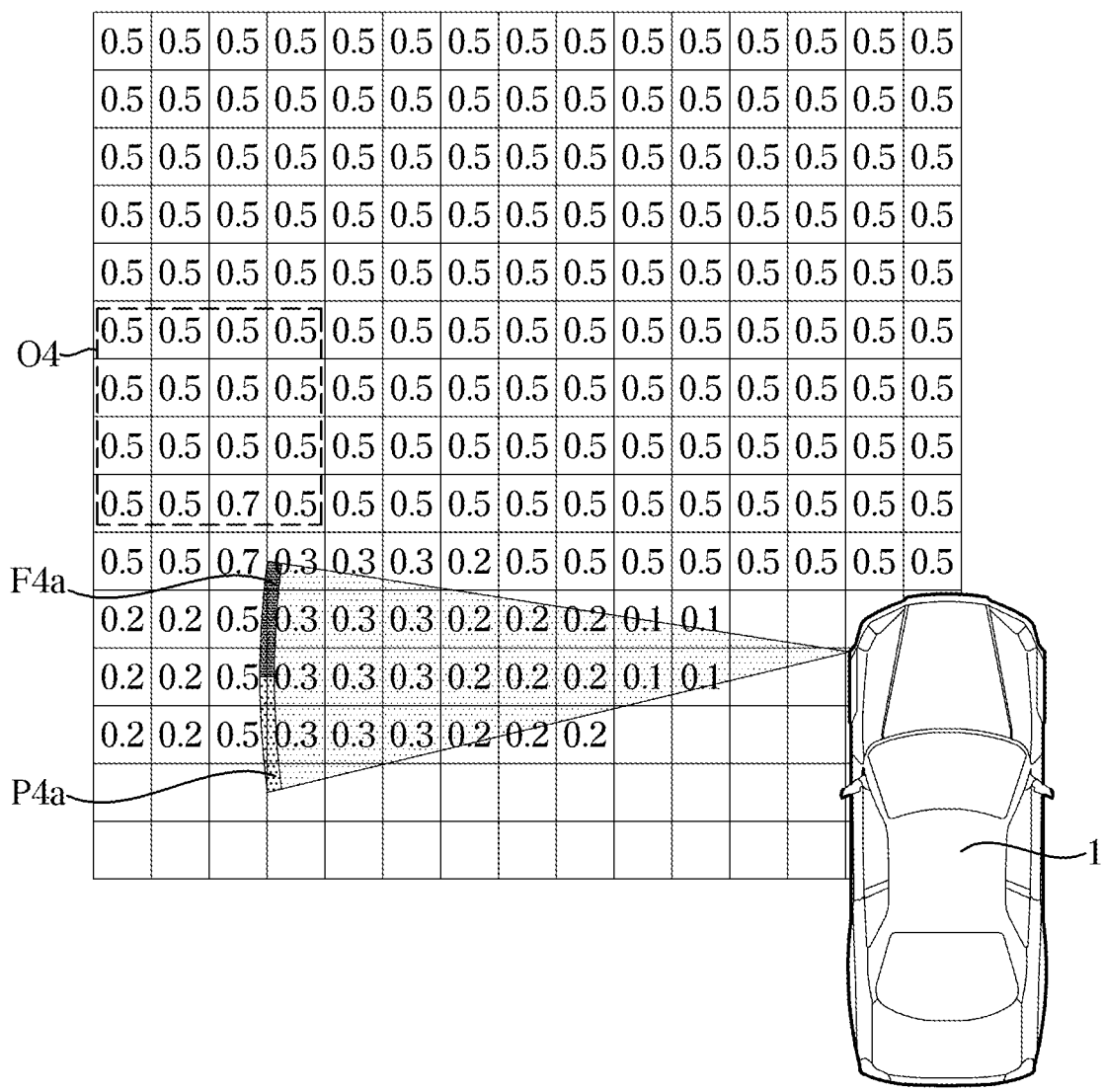
Figure 4B:
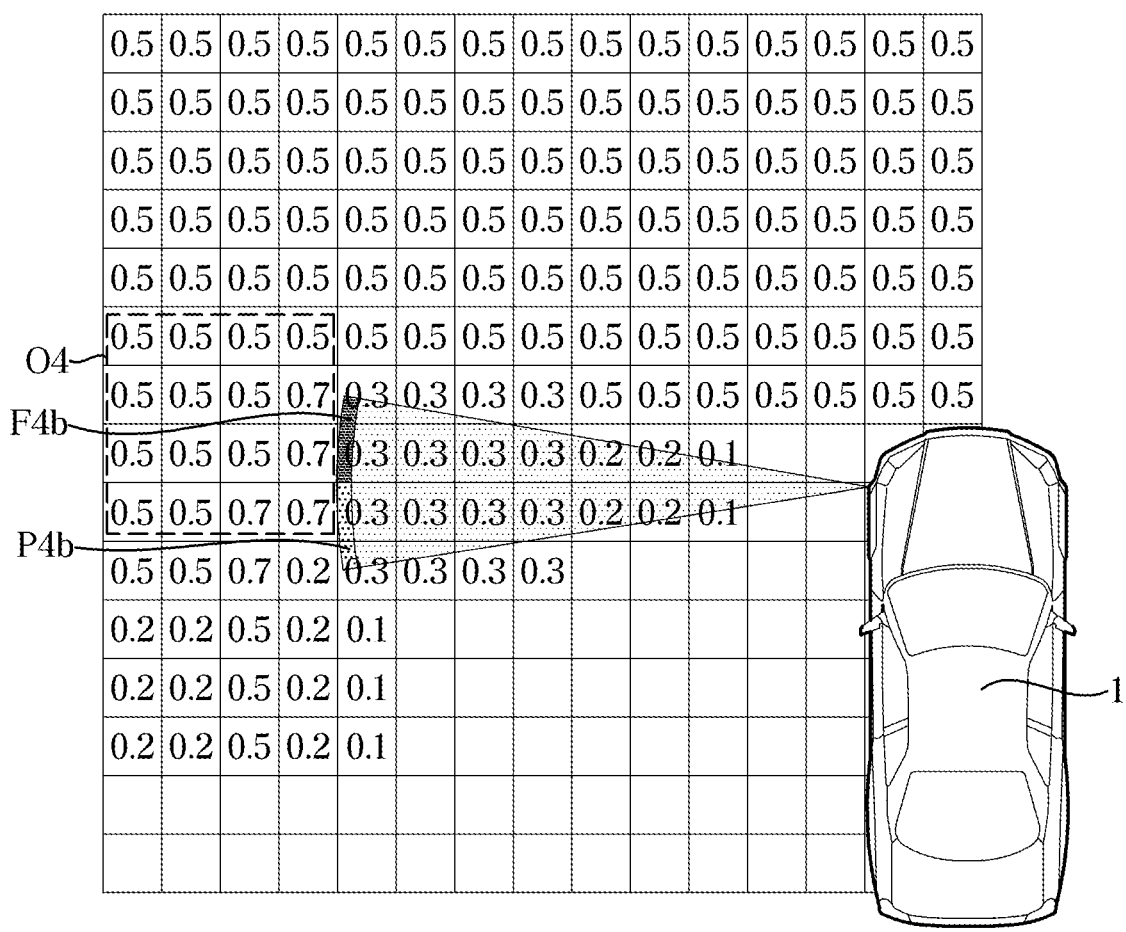

Referring to FIGS. 4A and 4B, the controller assigns a first weight to occupancy information of an area measured in real time, and assigns a second weight larger than the first weight to occupancy information of a previously measured area, so that map information including an occupancy grip map may be formed.

Specifically, the first weight may be assigned to areas F4a and F4b measured in real time, and the second weight may be assigned to areas P4a and P4b previously measured.

The controller may lower the reliability of obstacle detection of an area measured in real time, that is, an area of the obstacle detected area having not been passed, and increase the reliability of an area having been passed.

Therefore, the second weight may be provided as a value greater than that of the first weight.

That is, the controller may apply the first weight to an obstacle undetected area F4a at an initial detection time point to reduce the occupancy probability, thereby inhibiting an obstacle from being excessively detected.

In addition, referring to FIG. 4B, each cell in the obstacle detected area, which measured in real time, may be further provided with the first weight, and when completed with the measurement, may be further provided with the second weight, so that the occupancy probability corresponding to each area may be updated.

Figure 4C:
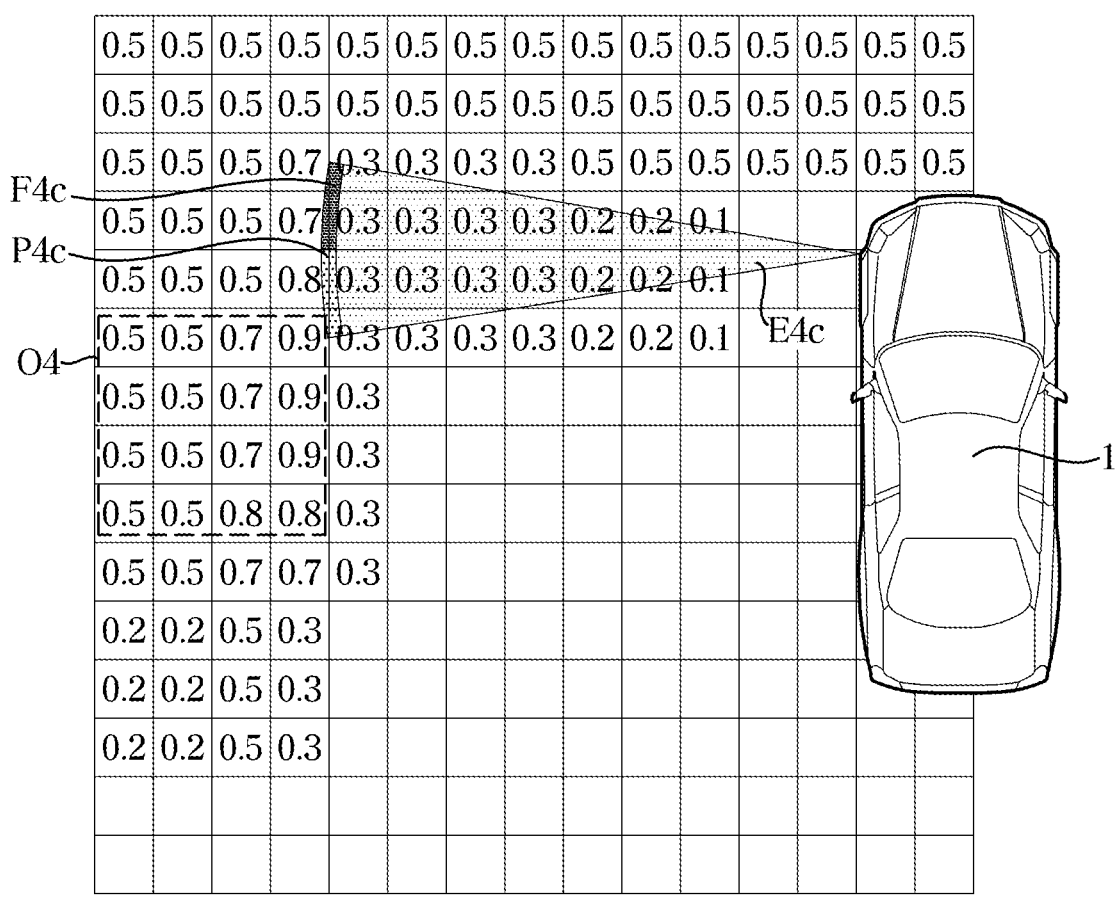
Figure 4D:
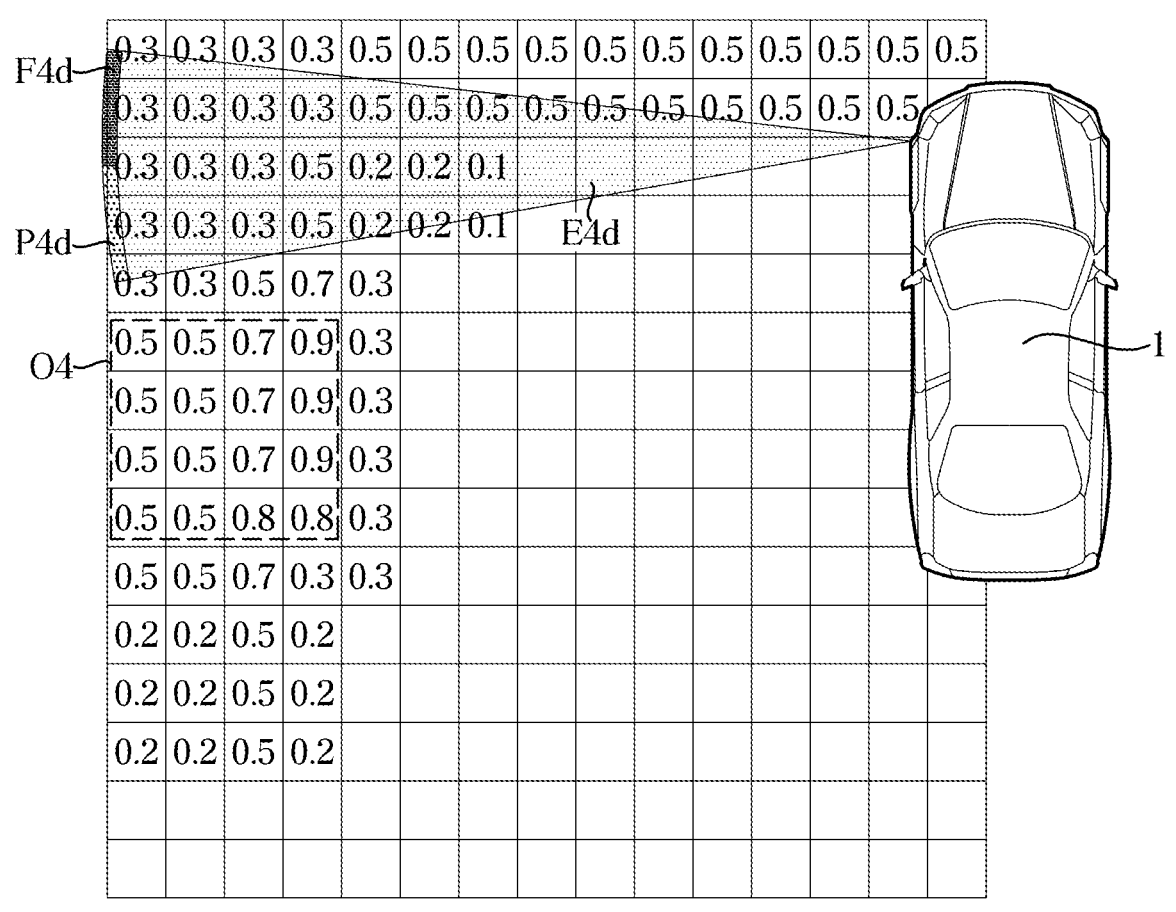

Meanwhile, referring to FIGS. 4C and 4D, the controller may form the map information by assigning the third weight to the occupancy information corresponding to spaces E4c and E4d.

Specifically, the controller may excessively detect an obstacle due to the ultrasonic sensor beam angle. When an area is determined to be a space having no obstacle, the controller may assign the third weight to the corresponding area.

In addition, referring to FIG. 4D, the controller may decrease the occupancy probability of the obstacle undetected area cell by a third weight at each time, so that the excessively detected area E4d may be deleted.

Additionally, the controller may apply a predetermined tuning parameter to each of an area where an obstacle exists, an area where an obstacle does not exist, and an area that has not yet been determined.

When an area including the obstacle coordinates detected by the time slice measurement model is in an occupied state, the controller may confirm the side obstacle coordinates.

In addition, the controller may remove the initial obstacle coordinates that are excessively detected from the time slice measurement model, through the comparison of the map information.

Based on the above-described operation, the controller may form the map information of the surrounding area of the vehicle with a higher accuracy through the ultrasonic sensor, occupation information acquired while changing the time, and processing.

Meanwhile, the operations described in FIGS. 4A to 4D are only one form of the present disclosure, and there is no limitation on the operation of forming the map information with an improved accuracy using the ultrasonic sensor.

Figure 5:
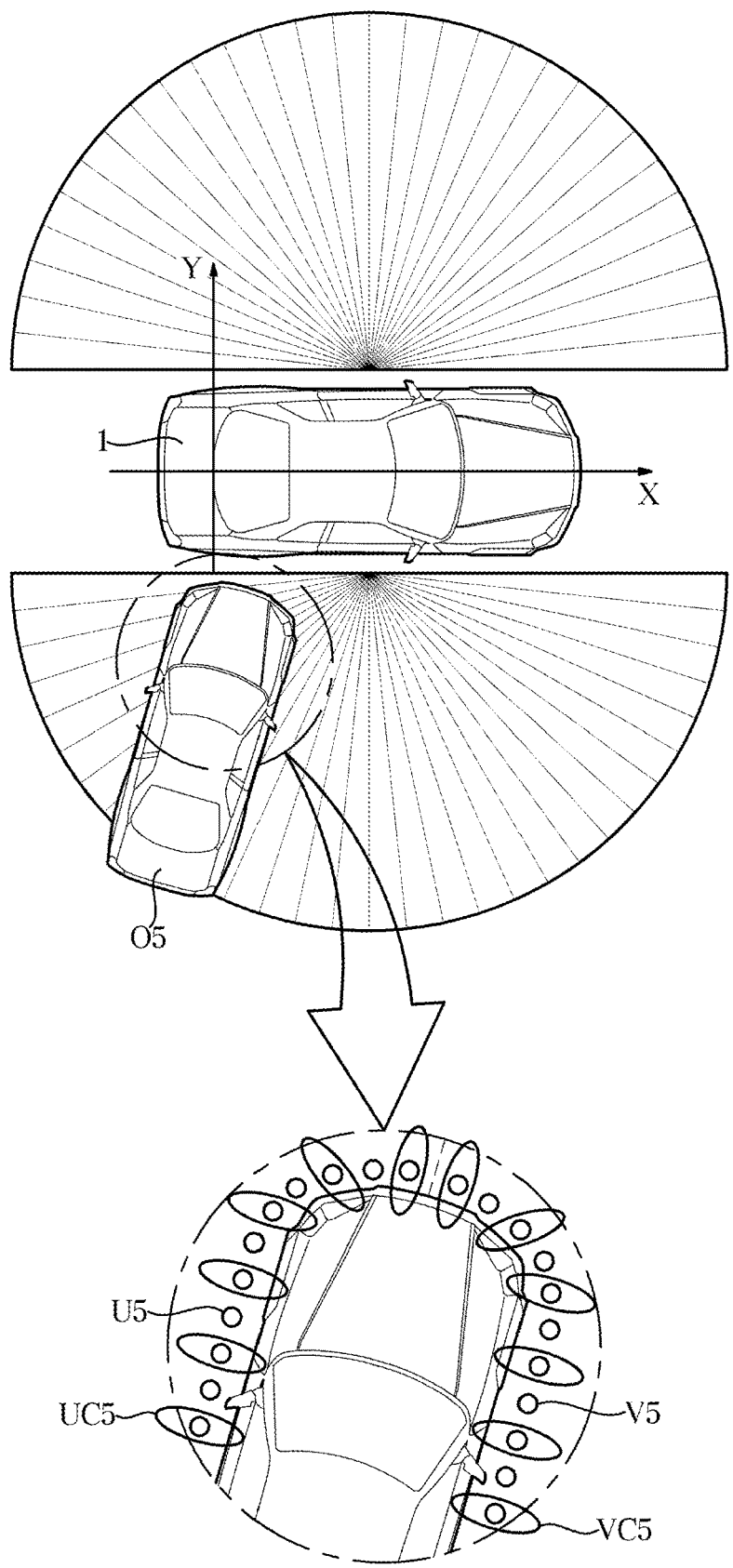
FIG. 5 is a diagram for describing an operation of detecting an obstacle based on a surrounding image and map information according to one form of the present disclosure.

FIG. 5 is a diagram for describing an operation of detecting an obstacle based on a surrounding image and map information according to one form of the present disclosure.

Specifically, a camera provided in the vehicle acquires a surrounding image of the vehicle, and the surrounding image of the vehicle may include spaces and obstacles.

Meanwhile, the controller may determine areas of a space, a normal obstacle (a vehicle, a pedestrian, and pillar), and a low obstacle (a curb and a parking stopper) within the image.

Specifically, the controller may measure the coordinates of an image recognition target, that is, an obstacle, using a relational expression between the image coordinate system and the vehicle coordinate system under the assumption of a flat road surface.

In addition, the controller may divide the surrounding area of the vehicle into radial cells and determine the coordinates of a space furthest from the vehicle in each cell as a space recognition result S5.

On the other hand, the controller may output the coordinates of an obstacle closest to the vehicle in each cell as an obstacle recognition result.

The controller according to one form of the present disclosure may determine occupancy information corresponding to the obstacle and pixels included in the surrounding image, and may form the map information based on the covariance of the occupancy information and the covariance of the pixels.

That is, the controller may perform coordinate correction by generating a combination of coordinates using the image recognition coordinates of the surrounding image of the vehicle recognized by the camera and the ultrasonic sensor map information.

Specifically, the controller may acquire coordinate information V5 of the surrounding image and map information U5 acquired by the ultrasonic sensor, and generate a combination of coordinates closest to each other among coordinates where the covariance VC5 of coordinate information V5 and the covariance UC5 of map information U5 overlap.

The controller may correct the obstacle coordinates O5 using the coordinates V5 of the image recognition and the coordinates U5 of the ultrasonic sensor map information as measurement values, and using respective covariances VC5 and UC5 as the measurement covariances.

When the coordinates of the obstacle are not located in a space, the controller may confirm the obstacle map. In this operation, a normal obstacle and a low obstacle in the map information may be divided from each other.

Specifically, the controller may classify obstacles of the map information confirmed using the surrounding images into a normal obstacle (a vehicle, a pedestrians, and a pillar) and a low obstacle (a curbstones and a parking stopper). In addition, with such an operation, an obstacle map may be confirmed. The controller may change the braking timing according to the obstacles classified as the above. Details thereof will be described below.

Figure 6:
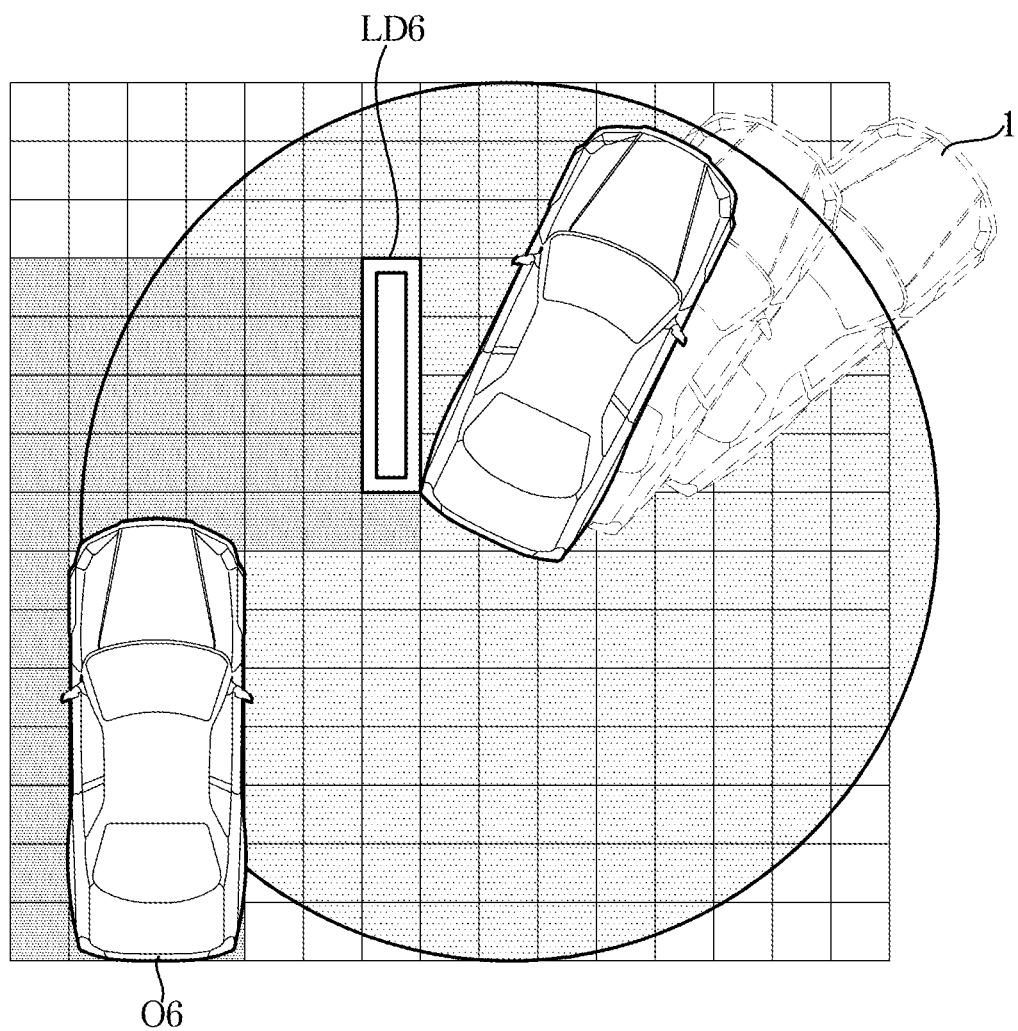
FIG. 6 is a diagram for describing braking control according to one form of the present disclosure.

FIG. 6 is a diagram for describing braking control according to one form of the present disclosure.

Operations described in FIG. 6 illustrate an actual form to which the above-described operations are applied together with a collision expected time (Time To Collision, TTC) between a vehicle and an obstacle.

The controller may determine a time to collision between the vehicle and the obstacle, and determine a possibility of collision based on the time to collision.

In addition, when the possibility of collision exceeds a predetermined reference value and the obstacle corresponds to a normal obstacle, the controller may control the braking part to immediately stop the vehicle.

Meanwhile, when the obstacle corresponds to a low obstacle, the controller may control the braking part to stop the vehicle after a predetermined time since the obstacle is detected.

The controller may determine the time to collision between the vehicle and the obstacle, and compare the time to collision with a reference braking time corresponding to the vehicle speed to determine a braking timing of the brake part.

Referring to FIG. 6, a parking stopper LO6 exists behind the vehicle and the rear wheel in a surrounding area of the vehicle. The controller may form map information based on the ultrasonic sensor provided in the vehicle.

In addition, the controller recognizes a space, a target vehicle O6, and the parking stopper LO6 based on the camera.

The controller may determine a time to collision based on the vehicle speed and the map information.

According to one form, the reference braking time for a vehicle speed of 3 kph may be determined to be 0.8 seconds.

Meanwhile, according to one form, in FIG. 6, the time to collision between the vehicle and the target vehicle O6 is determined to be 0.9 seconds, and the time to collision between the vehicle and the parking stopper LO6 is determined to be 0.78 seconds.

On the other hand, in the case of FIG. 6, the risk of collision with the target vehicle O6 is low due to the position of the target vehicle, so that emergency braking is not needed. On the other hand, there is a risk of collision with the parking stopper LO6, but the parking stopper LO6 is classified as a low obstacle behind the rear wheel, and thus the braking timing may be delayed.

According to one form, in FIG. 6, the reference braking time corresponding to the vehicle speed of 3 kph is 0.8 seconds, but because the parking stopper LO6 is positioned near the rear wheel in FIG. 6, the reference braking time may be determined as 0.74. Therefore, the controller needs to perform braking control after 0.074 seconds.

However, since the parking stopper LO6 is an obstacle classified as a low obstacle, and the controller determines the time to collision with the parking stopper LO6 as 0.78 seconds, the controller may perform braking on the vehicle at a time delayed by 0.04 seconds from the reference braking time.

Meanwhile, the form including the time to collision described in FIG. 6 is only an example for describing the operation of the present disclosure, and various modifications may apply to the time to collision and an application thereof.

Figure 7:
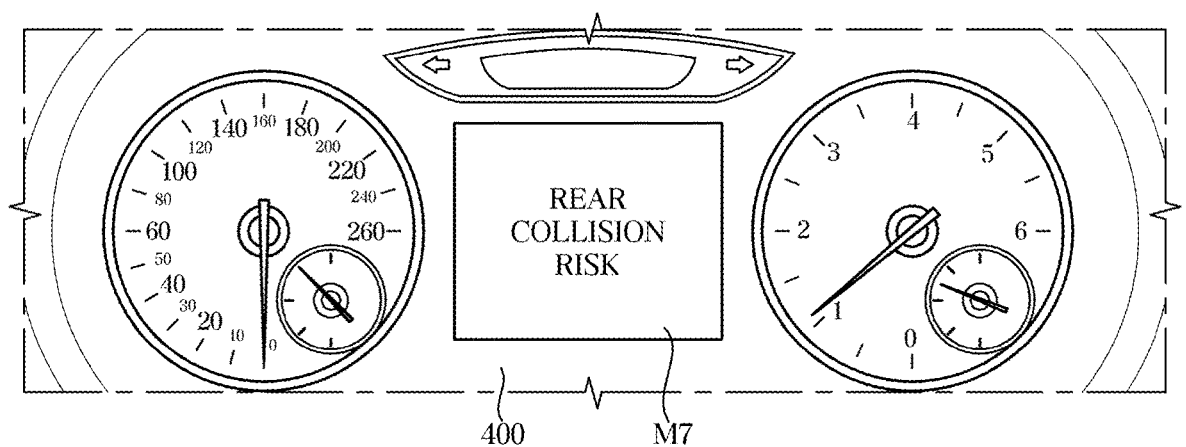
FIG. 7 is a diagram for describing an operation of outputting a warning signal according to one form of the present disclosure.

FIG. 7 is a diagram for describing an operation of outputting a warning signal according to one form of the present disclosure.

The controller may determine the possibility of collision by comparing a reference time corresponding to the vehicle speed and the time to collision between the vehicle and the obstacle.

In addition, the controller may output a warning signal when the possibility of collision exceeds a predetermined reference value.

According to one form of the present disclosure, the warning signal may be output from a display provided in a cluster. According to an embodiment, the warning signal may be output through a message M7, e.g., "rear collision risk".

On the other hand, there are no restrictions on the form or type of outputting the warning signal.

Figure 8:
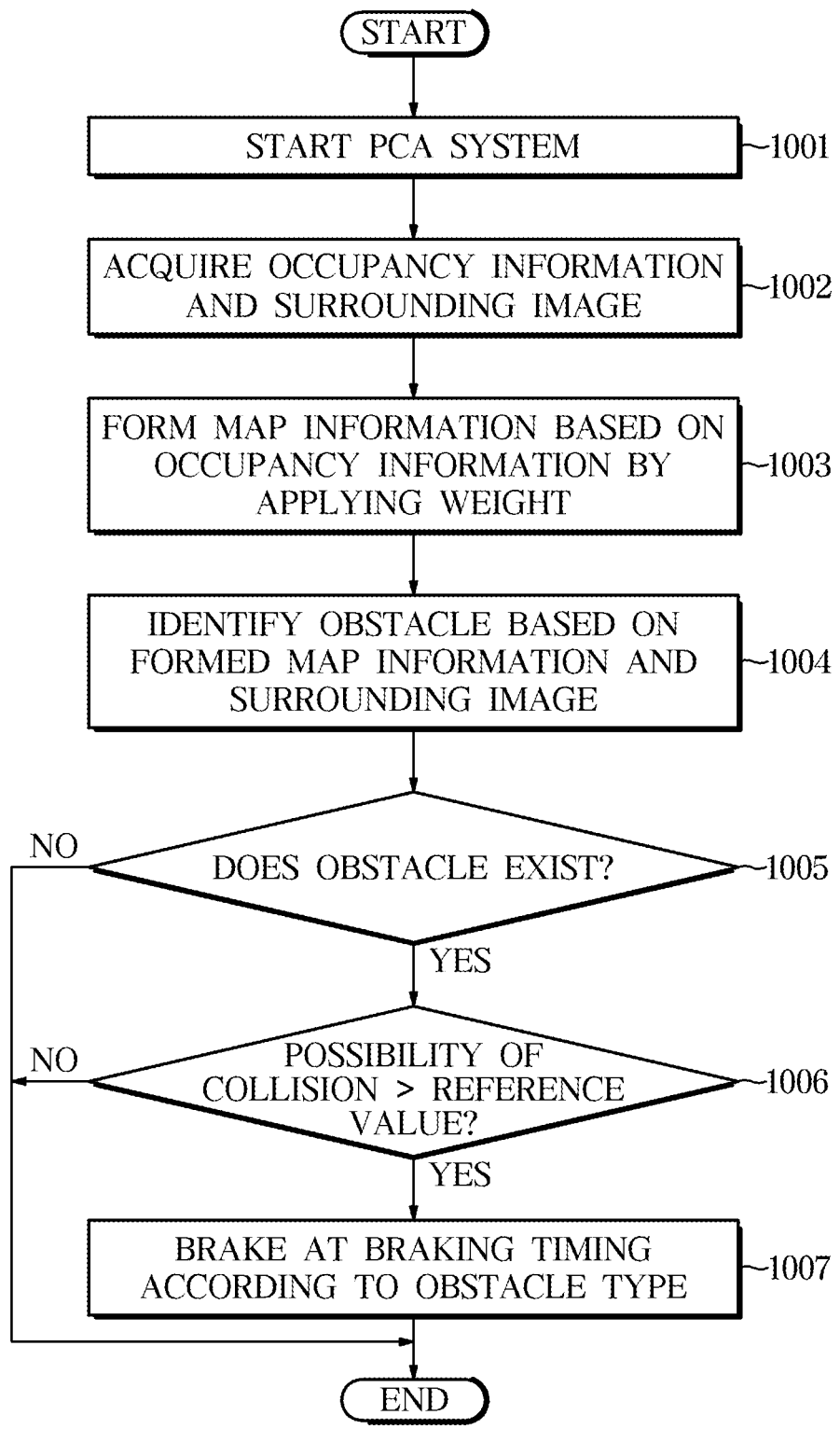
FIG. 8 is a flowchart according to one form of the present disclosure.

FIG. 8 is a flowchart according to one form of the present disclosure.

Referring to FIG. 8, the vehicle may start a parking collision avoidance assist system (1001).

In addition, the vehicle may acquire occupancy information from the ultrasonic sensor and acquire a surrounding image through the camera (1002).

Meanwhile, the controller may form map information based on the occupancy information to which weights are applied (1003).

In addition, the controller may identify an obstacle based on the formed map information and the surrounding image (1004). The identifying of the obstacle may include determining the presence or absence of the obstacle and determining the type of the obstacle.

On the other hand, when an obstacle is present (1005) and the possibility of collision between the vehicle and the obstacle exceeds a reference value (1006), the controller may perform braking by determining a different braking timing of the vehicle according to the type of the obstacle (1007).

Meanwhile, the disclosed forms may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle and the method of controlling the same can inhibit erroneous braking in a parking collision-avoidance assist (PCA) system by estimating the position of an obstacle using an ultrasonic sensor and a camera provided in the vehicle.

Although exemplary forms of the present disclosure have been described for illustrative purposes, those skilled in the art will appreciate that various modifications, additions and substitutions are possible, without departing from the scope and spirit of the disclosure. Therefore, exemplary forms of the present disclosure have not been described for limiting purposes.

What is claimed is:

1. A vehicle comprising:
   a sensor part configured to acquire occupancy information of a surrounding area of the vehicle and a speed of the vehicle;
   a camera configured to acquire a surrounding image of the vehicle; and
   a controller configured to:
      form map information based on the occupancy information according to movement of the vehicle;
      determine presence or absence of an obstacle around the vehicle based on the map information and the surrounding image; and
      control, in response to the presence of the obstacle, the vehicle based on the presence of the obstacle and a possibility of collision of the vehicle derived from the speed of the vehicle and the map information,
   wherein the controller is configured to:
      form the map information by assigning a first weight to occupancy information of a first area that is measured in real time, assigning a second weight greater than the first weight to occupancy information of a second area that is previously measured, and assigning a third weight to the occupancy information corresponding to a third area that has no obstacle.

2. The vehicle of claim 1, wherein the controller classifies each pixel included in an image based on the surrounding image into one of a space, a low obstacle, and a normal obstacle.

3. The vehicle of claim 2, wherein the controller is configured to determine a time to collision between the vehicle and the obstacle, and when the possibility of collision of the vehicle exceeds a predetermined reference value and the obstacle corresponds to the normal obstacle, stop the vehicle.

4. The vehicle of claim 1, wherein the controller is configured to determine the occupancy information corresponding to the obstacle and pixels included in the surrounding image, and form the map information based on a covariance of the occupancy information and a covariance of the pixels.

5. The vehicle of claim 1, further comprising an outputter, wherein the controller is configured to output a warning signal to the outputter based on the possibility of collision of the vehicle.

6. The vehicle of claim 1, wherein the possibility of collision of the vehicle is determined by comparing a reference time corresponding to the speed of the vehicle with a time to collision of the vehicle with the obstacle.

7. The vehicle of claim 1, further comprising a braking part,
wherein the controller is configured to control the braking part based on the possibility of collision of the vehicle.

8. A vehicle comprising:
a sensor part configured to acquire occupancy information of a surrounding area of the vehicle and a speed of the vehicle;
a camera configured to acquire a surrounding image of the vehicle; and
a controller configured to:
form map information based on the occupancy information according to movement of the vehicle;
determine presence or absence of an obstacle around the vehicle based on the map information and the surrounding image; and
control, in response to the presence of the obstacle, the vehicle based on the presence of the obstacle and a possibility of collision of the vehicle derived from the speed of the vehicle and the map information,
wherein the controller is further configured to:
classify each pixel included in an image based on the surrounding image into one of a space, a low obstacle, and a normal obstacle, and
when the possibility of collision of the vehicle exceeds a predetermined reference value and the obstacle corresponds to the low obstacle, stop the vehicle after a predetermined time since the obstacle is detected.

9. The vehicle of claim 8, wherein the controller is configured to determine a time to collision between the vehicle and the obstacle, compare the time to collision with a reference braking time corresponding to the speed of the vehicle, and determine a braking timing of the vehicle.

10. A method of controlling a vehicle, the method comprising:
acquiring, by a sensor part, occupancy information of a surrounding area of the vehicle and a speed of the vehicle;
acquiring, by a camera, a surrounding image of the vehicle;
forming, by a controller, map information based on the occupancy information according to movement of the vehicle;
determining, by a controller, a presence or absence of an obstacle around the vehicle based on the map information and the surrounding image; and
controlling, by a controller, in response to the presence of the obstacle, the vehicle based on the presence of the obstacle and a possibility of collision of the vehicle derived from the speed of the vehicle and the map information,
wherein the forming the map information comprises:
assigning a first weight to occupancy information of a first area that is measured in real time;
assigning a second weight greater than the first weight to occupancy information of a second area that is previously measured; and
assigning a third weight to occupancy information corresponding to a third area that has no obstacle.

11. The method of claim 10, wherein forming the map information includes classifying each pixel included in an image based on the surrounding image into one of a space, a low obstacle, and a normal obstacle.

12. The method of claim 11, wherein controlling the vehicle includes:
determining a time to collision between the vehicle and the obstacle; and
when the possibility of collision of the vehicle exceeds a predetermined reference value and the obstacle corresponds to the normal obstacle, stopping the vehicle.

13. The method of claim 10, wherein forming the map information includes:
determining the occupancy information corresponding to the obstacle and pixels included in the surrounding image; and
forming the map information based on a covariance of the occupancy information and a covariance of the pixels.

14. A method of controlling a vehicle, the method comprising:
acquiring, by a sensor part, occupancy information of a surrounding area of the vehicle and a speed of the vehicle;
acquiring, by a camera, a surrounding image of the vehicle;
forming, by a controller, map information based on the occupancy information according to movement of the vehicle;
determining, by a controller, a presence or absence of an obstacle around the vehicle based on the map information and the surrounding image; and
controlling, by a controller, in response to the presence of the obstacle, the vehicle based on the presence of the obstacle and a possibility of collision of the vehicle derived from the speed of the vehicle and the map information,
wherein the forming the map information includes classifying each pixel included in an image based on the surrounding image into one of a space, a low obstacle, and a normal obstacle, and
wherein the controlling the vehicle includes when the possibility of collision of the vehicle exceeds a predetermined reference value and the obstacle corresponds to the low obstacle, stopping the vehicle after a predetermined time since the obstacle is detected.

15. The method of claim 14, wherein controlling the vehicle comprises determining a time to collision between the vehicle and the obstacle, comparing the time to collision with a reference braking time corresponding to the speed of the vehicle, and determining a braking timing of the vehicle.

16. A vehicle comprising:
an ultrasonic sensor configured to acquire occupancy information of a surrounding area of the vehicle based on an ultrasonic signal;
a wheel speed sensor configured to acquire a speed of the vehicle;
a camera configured to acquire a surrounding image of the vehicle; and
at least one processor configured to:
assign an occupation probability corresponding to the occupancy information;
by using a time-slice measurement model determined based on the speed of the vehicle, assign a first weight to occupancy information of a first area that is measured in real time, assign a second weight greater than the first weight to occupancy information of a second area that is previously measured to determine an occupancy probability of the second area, assign a third weight to occupancy information corresponding to a third area that has no obstacle to reduce an occupancy probability corresponding to the third area;
determine coordinate information corresponding to the surrounding image and the vehicle;
determine an obstacle map by classifying each pixel corresponding to the occupancy information into at least one of a space, a low obstacle, and a normal obstacle on the basis of a covariance corresponding to map information based on the occupancy information and a covariance of coordinate information based on the surrounding image; and
control the vehicle based on the obstacle map.

* * * * *